United States Patent [19]

Miyaoh

[11] Patent Number: 5,449,181
[45] Date of Patent: Sep. 12, 1995

[54] METAL LAMINATE GASKET WITH PRE-BENT PORTION

[75] Inventor: Yoshio Miyaoh, Tokyo, Japan

[73] Assignee: Ishikawa Gasket Co., Ltd., Tokyo, Japan

[21] Appl. No.: 131,426

[22] Filed: Oct. 4, 1993

[30] Foreign Application Priority Data

Oct. 6, 1992 [JP] Japan .................. 4-075469 U

[51] Int. Cl.⁶ ............................................. F16J 15/08
[52] U.S. Cl. ............................. 277/235 B; 277/180; 277/232; 277/234
[58] Field of Search ............... 277/180, 232, 233, 234, 277/235 B, 236

[56] References Cited

U.S. PATENT DOCUMENTS

| | | |
|---|---|---|
| 4,834,399 | 5/1989 | Udagawa et al. ............ 277/234 |
| 4,938,488 | 7/1990 | Udagawa et al. ............ 277/235 B |
| 5,092,613 | 3/1992 | Udagawa ................... 277/235 B |
| 5,120,078 | 6/1992 | Udagawa ................... 277/235 B |
| 5,161,498 | 11/1992 | Miyaoh ................... 277/235 B X |
| 5,165,372 | 11/1992 | Miyaoh ................... 277/235 B X |
| 5,169,163 | 12/1992 | Udagawa et al. ............ 277/235 B |
| 5,226,663 | 7/1993 | Miyaoh ................... 277/235 B |
| 5,255,927 | 10/1993 | Miyaoh ................... 277/235 B |
| 5,277,433 | 1/1994 | Ishikawa et al. ........... 277/180 X |
| 5,395,127 | 3/1995 | Miyaoh ................... 277/235 B |

Primary Examiner—William A. Cuchlinski, Jr.
Assistant Examiner—John L. Beres
Attorney, Agent, or Firm—Kanesaka & Takeuchi

[57] ABSTRACT

A metal laminate gasket of the invention is installed for an internal combustion engine having at least one hole to be sealed. The gasket is basically formed of first, second and third metal plates laminating together and extending substantially throughout the entire area of the engine. The first plate includes a curved portion to define a first hole corresponding to the hole of the engine and a flange. The second plate is situated above the first plate and has a thickness greater than that of the first plate. The second plate includes a pre-bent inclined portion between a second base portion and an edge portion located under the flange. The third plate is situated between the first and second plates and has the thickness less than that of the first plate. A third hole of the third plate is greater than an outer diameter of the inclined portion. When the first, second and third plates are assembled, the third plate is located between the first and second base portions without laminating the inclined portion, and a space thinner than the thickness of the third plate is formed between the edge portion and the first base portion.

6 Claims, 1 Drawing Sheet

METAL LAMINATE GASKET WITH PRE-BENT PORTION

BACKGROUND OF THE INVENTION AND RELATED ART STATEMENT

The present invention relates to a metal laminate gasket containing a thick metal plate with a pre-bent portion around a hole to be sealed.

In metal laminate gaskets formed of a plurality of metal plates, there is a gasket such that one outer plate is turned to have a curved portion and a flange around a hole, and an edge portion of the other outer plate situated above the one outer plate is located under the flange. In this case, a pressure regulation-plate having a hole larger than an outer diameter of the flange is generally disposed between the two outer plates. The pressure regulation plate operates to regulate pressure at the flange. Since the pressure regulation plate does not extend under the flange, it reduces the thickness at the flange as well.

In case the other outer plate is too thick, such as over 0.4 mm, when the gasket is tightened, a large force is required to bend the other outer plate under the flange. In particular, a large surface pressure is concentrated at the edge of the hole of the pressure regulation plate. Thus, when the gasket is installed, a desired surface pressure can not be formed around the hole to be sealed.

In the conventional metal laminate gasket, no specific attention is paid for bending a thick metal plate for the purpose of controlling the surface pressure around a hole to be sealed.

Accordingly, one object of the present invention is to provide a metal laminate gasket, which can provide an adequate surface pressure around a hole to be sealed without local concentration of a surface pressure.

Another object of the invention is to provide a metal laminate gasket as stated above, wherein the surface pressure can be controlled easily as desired.

A further object of the invention is to provide a metal laminate gasket as stated above, which can be easily and economically manufactured.

Further objects and advantages of the invention will be apparent from the following description of the invention.

SUMMARY OF THE INVENTION

A metal laminate gasket of the invention is used for an internal combustion engine having at least one hole to be sealed. The gasket is basically formed of three metal plates, i.e. first, second and third plates, extending substantially throughout an entire area of the engine. The second plate or an upper plate has a thickness over 0.4 mm and is thicker than the first and third plates.

The first plate or a lower plate includes a first base portion, a first hole corresponding to the hole of the engine, a curved portion to define the first hole, and a flange. The flange extends from the curved portion in a direction away from the first hole and is located above the first base portion.

The second plate is situated above the first base portion. The second plate includes a second base portion, a second hole larger than the first hole, an edge portion around the second hole, and a pre-bent inclined portion situated between the second base portion and the edge portion. The edge portion is located under the flange when the gasket is assembled.

The third plate or a middle plate has a thickness less than that of the first plate and is situated between the first and second plates. The third plate has a third hole greater than an outer diameter of the inclined portion. Thus, when the first, second and third plates are assembled, the third plate is located between the first and second base portions without laminating the inclined portion, and a space thinner than the thickness of the third plate is formed between the edge portion and the first base portion.

In the invention, the second plate is bent at the inclined portion before assembling with the first and third plates. The height of the inclined portion, i.e. the vertical difference between the edge portion and the second base portion, is less than the thickness of the third plate.

Thus, when the gasket is assembled and tightened, the edge portion is compressed and the inclined portion is bent slightly further. But the force required to bend the inclined portion is not great, so that the adequate surface pressure is formed by the inclined portion. No special surface pressure is concentrated at the edge of the third hole. Surface pressure can be regulated by changing the thickness of the surface pressure regulation plate.

The metal laminate gasket of the invention may further include a fourth plate situated above the second plate. The fourth plate has a fourth hole corresponding to the second hole, an edge portion located between the flange and the edge portion of the second plate, and a bead formed around the edge portion of the fourth plate. The bead has a width greater than that of the inclined portion so that the inclined portion is located under the bead. The bead can provide a surface pressure outside the flange of the first plate.

DETAILED DESCRIPTION OF PREFERRED EMBODIMENT

Figure 1:
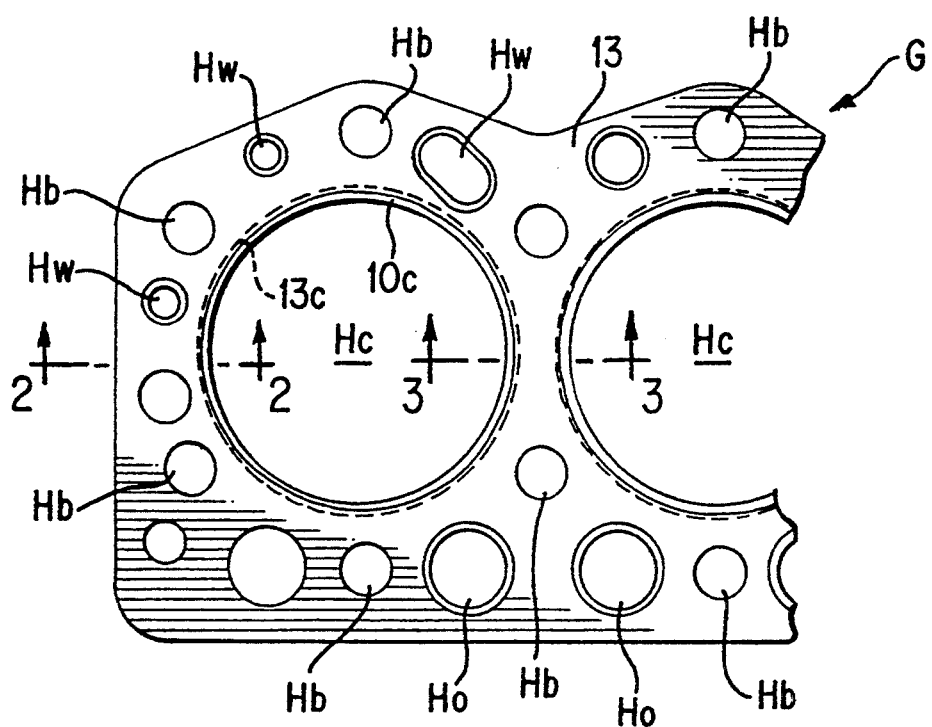
FIG. 1 is a plan view for showing a part of a metal laminate gasket of the invention.
Figure 2:
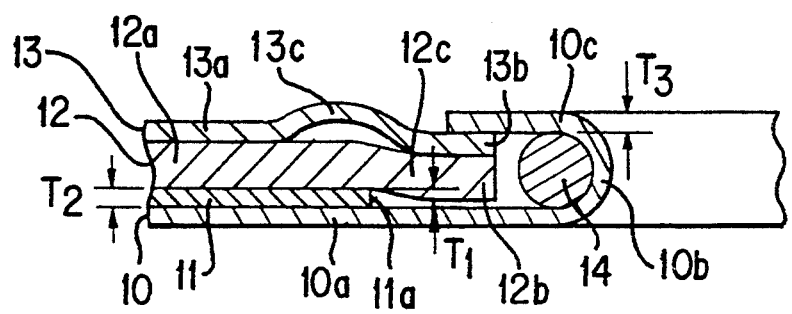
FIG. 2 is an enlarged section view taken along a line 2—2 in FIG. 1.
Figure 3:
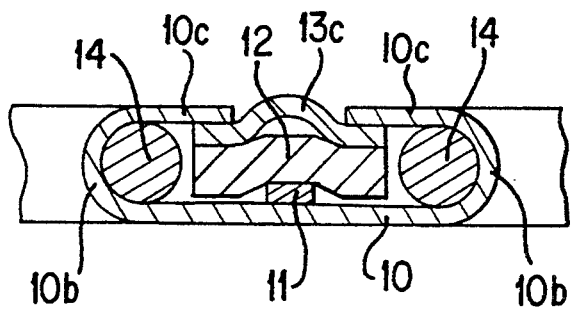
FIG. 3 is an enlarged section view taken along a line 3—3 in FIG. 1.

With reference to FIGS. 1–3, a gasket G of the present invention is shown. The gasket G is a cylinder head gasket, and includes a plurality of cylinder bores Hc, water holes Hw, oil holes Ho and bolt holes Hb, as in the conventional gasket.

The gasket G includes sealing portions around the cylinder bores Hc, which are formed in accordance with the invention. Portions around other holes may be sealed by conventional sealing devices. However, if desired, the portions around the other holes may have the same structure as in the present invention.

The gasket G is formed of a lower metal plate 10, middle metal plates 11, 12 and an upper metal plate 13. The plates 10–13 extend substantially throughout an entire area of an engine.

The lower plate 10 includes a base portion 10a, a curved portion 10b for defining the cylinder bore Hc, and a flange 10c located above the base portion 10a. A wire ring 14 is installed to surround the curved portion 10b.

The middle plate 11 includes an edge 11a to define a hole larger than an outer diameter of the flange 10c, and is located above the base portion 10a. The flange 10c does not overlap the middle plate 11.

The middle plate 12 includes a base portion 12a located above the middle plate 11, an edge portion 12b to define a hole larger than the cylinder bore Hc and smaller than the hole of the middle plate 11, and a pre-bent inclined portion 12c between the base portion 12a and the edge portion 12b. The inclined portion 12c is formed at the time of forming the plate 12 to have a distance, i.e. difference between the edge portion 12b and the base portion 12a, less than the thickness of the middle plate 11.

The upper plate 13 is located above the middle plate 12. The upper plate 13 includes a base portion 13a, an edge portion 13b situated above the edge portion 12b, and a bead 13c between the base portion 13a and the edge portion 13b. The inclined portion 12c is located under the bead 13c.

Although the beads 13c are formed around the respective cylinder bores Hc, as shown in FIG. 3, the beads 13c around the cylinder bores Hc are joined together at a portion between the adjacent two cylinder bores Hc. The beads 13c can seal between the cylinder bores Hc.

In the gasket G, the flange 10c is located above the edge portions 12b, 13b, but does not overlap the middle plate 11. The middle plate 11 operates as a surface pressure regulation plate for the flange 10c.

The thickness $T_3$ of the plate 10 is greater than the thickness $T_2$ of the plate 11 to provide surface pressure at the flange 10c when the gasket is tightened. The distance $T_1$ at the inclined portion 12c is less than the thickness of the plate 11. The thickness of the plate 12 is greater than that of the plate 10 and is over 0.4 mm. When the gasket is assembled, the edge portion 12b does not abut against the base portion 10a. Namely, a space is formed between the edge portion 12b and the base portion 10a.

When the gasket G is tightened, the edges 13b, 12b are pushed toward the base portion 10a. Since the edge portion 12b has the inclined portion 12c formed at the time of preparing the plate 12, the edge 12b can be bent easily without large tightening force. Thus, although the plate 12 is thick, the gasket G can be tightened easily. No specific surface pressure is formed at the edge 11a.

When the gasket G is tightened, the bead 13c is also compressed and provides surface pressure outside the flange 10c. Since the bead 13c does not contact the inclined portion 12c, the bead 13c is not affected by the inclined portion 12c.

Further, when the gasket G is tightened, the wire ring 14 is slightly compressed. Relatively large surface pressure is formed at the flange by the wire ring and the edge portions 12b, 13b, while a moderate surface pressure is formed by the bead 13c.

No local high surface pressure is formed around the cylinder bore Hc. Thus, the surface pressure around the cylinder bore Hc can be easily controlled. Deformation of a cylinder head and a cylinder block around the cylinder bore by local high surface pressure is prevented.

While the invention has been explained with reference to the specific embodiment of the invention, the explanation is illustrative and the invention is limited only by the appended claims.

What is claimed is:

1. A metal laminate gasket for an internal combustion engine having at least one hole to be sealed, comprising:

a first metal plate having a first base portion extending substantially throughout an entire area of the engine, a first hole corresponding to the hole of the engine, a curved portion to define the first hole and extending from the first base portion, and a flange extending from the curved portion in a direction away from the first hole and located above the first base portion, a second metal plate situated above the first base portion of the first plate and having a thickness greater than that of the first plate, said second plate including a second base portion, a second hole larger than the first hole, an edge portion formed around the second hole and situated under the flange, and a pre-bent inclined portion situated between the second base portion and the edge portion without piling the flange so that the edge portion is located closer to the first base portion than the second base portion, and a third metal plate situated between the first and second plates, said third plate having the thickness less than that of the first plate and greater than a distance between the second base portion and the edge portion in a direction of the thickness of the second plate, and a third hole greater than an outer diameter of the inclined portion so that when the first, second and third plates are assembled, the third plate is located between the first and second base portions without laminating the inclined portion, and a space thinner than the thickness of the third plate is formed between the edge portion and the first base portion, said space being eliminated without deforming an edge of the third plate around the third hole when the gasket is tightened.

2. A metal laminate gasket according to claim 1, further comprising a fourth plate situated above the second plate and extending substantially throughout the entire area of the engine, said fourth plate having a fourth hole corresponding to the second hole, an edge portion located between the flange and the edge portion of the second plate, and a bead formed around the edge portion of the fourth plate, said bead having a width greater than that of the inclined portion so that the inclined portion is located under the bead.

3. A metal laminate gasket according to claim 2, wherein said engine includes at least two holes, and said fourth plate includes at least two fourth holes and two beads around the fourth holes, said beads combining and forming one bead at a portion between the fourth holes.

4. A metal laminate gasket according to claim 2, further comprising a wire ring between the flange and the first base portion. .

5. A metal laminate gasket according to claim 1, wherein said second plate has the thickness more than 0.4 mm.

6. A metal laminate gasket for an internal combustion engine having at least one hole to be sealed, comprising:

a first metal plate having a first base portion extending substantially throughout an entire area of the engine, a first hole corresponding to the hole of the engine, a curved portion to define the first hole and extending from the first base portion, and a flange extending from the curved portion in a direction away from the first hole and located above the first base portion, a second metal plate situated above the first base portion of the first plate and having a thickness greater than that of the first plate, said second plate including a second base portion, a second hole larger than the first hole, an edge portion formed around the second hole and situated under the flange, and a pre-bent inclined portion situated between the second base portion and the edge portion so that the edge portion is located closer to the first base portion than the second base portion, a third metal plate situated between the first and second plates, said third plate having the thickness less than that of the first plate, and a third hole greater than an outer diameter of the inclined portion so that when the first, second and third plates are assembled, the third plate is located between the first and second base portions without laminating the inclined portion, and a space thinner than the thickness of the third plate is formed between the edge portion and the first base portion, and a fourth plate situated above the second plate and extending substantially throughout the entire area of the engine, said fourth plate having a fourth hole corresponding to the second hole, an edge portion located between the flange and the edge portion of the second plate, and a bead formed around the edge portion of the fourth plate, said bead having a width greater than that of the inclined portion so that the inclined portion is located under the bead.

* * * * *